United States Patent [19]

Seiger

[11] Patent Number: 4,704,194

[45] Date of Patent: Nov. 3, 1987

[54] ELECTRODE FORMATION

[75] Inventor: Harvey N. Seiger, Mayfield Heights, Ohio

[73] Assignee: Gould Inc., Rolling Meadows, Ill.

[21] Appl. No.: 889,964

[22] Filed: Jul. 28, 1986

[51] Int. Cl.[4] .......................................... H01M 10/44
[52] U.S. Cl. ....................................... 204/2.1; 429/210
[58] Field of Search ................. 204/2.1; 429/210, 129, 429/136, 66, 209; 320/4

[56] References Cited

U.S. PATENT DOCUMENTS

| | | | |
|---|---|---|---|
| 3,671,320 | 6/1972 | Herman et al. | 204/2.1 |
| 3,671,321 | 6/1972 | Herman et al. | 204/2.1 |
| 4,172,184 | 10/1979 | Bloom et al. | 204/2.1 X |
| 4,269,907 | 5/1981 | Momyer et al. | 429/67 |
| 4,461,677 | 7/1984 | Katan et al. | 204/2.1 |

Primary Examiner—Anthony Skapars
Attorney, Agent, or Firm—Wood, Dalton, Phillips, Mason & Rowe

[57] ABSTRACT

A system and a method useful in the formation of electrodes for use in electrochemical cells are disclosed. The system includes a pair of conductive metallic terminal electrodes spaced apart from one another and disposed in an aqueous electrolyte. The terminal electrodes are in electrical contact with a power supply to effect a flow of current in the electrolyte away from the first of the terminals and toward the second of the terminals. At least one precursor electrode comprising a material to be reduced or oxidized in electrical contact with a conductive backplate is disposed in the electrolyte between the terminals. The precursor electrode is oriented relative to the terminal electrodes so as to effect the reduction or oxidation of the material thereof. Restraining forces are applied to the precursor electrode to substantially maintain the dimensions of the precursor electrode during its reduction/oxidation. The system includes a separator effective in permitting the precursor and terminal electrodes to interface with the electrolyte. The separator permits a substantially uniform application of the restraining forces to the precursor electrode.

No electrical contacts are made directly to the electrodes being formed, this process then being a contactless charge.

26 Claims, 5 Drawing Figures

ELECTRODE FORMATION

BACKGROUND OF THE INVENTION

1. Field of the Invention

This ivention relates generally to electrochemical cells and, more particularly, this invention relates to electrodes and methods of formation thereof.

2. Description of Related Art

Electrochemical cells utilizing bipolar electrode designs having reactive metal electrodes supported on a substrate current collector are well known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. In such cells, the cathode may comprise an electrochemically active material, such as silver oxide, and the electrolyte may comprise an aqueous alkaline solution.

Momyer et al also discloses an electrochemical cell stack comprising a plurality of bipolar electrodes connected in series.

The preparation of bipolar electrodes wherein a cathode and an anode are disposed on opposite sides of an electrically conducting metallic substrate typically involves the oxidation/reduction of a precursor electrode material. For example, the preparation of a bipolar electrode having a silver oxide cathode typically involves oxidation of elemental silver. Typically, the elemental silver is sintered and then hot forged onto a substrate current collector. Nickel foil plated with silver, so as to facilitate adherence of elemental silver thereto, is commonly used as the substrate current collector.

In the oxidation of such precursor battery electrodes the hot forgings are assembled into a stack in which the elemental silver electrodes and counterelectrodes comprising a second kind of nickel foil are alternated, with the elemental silver electrodes in the charging stack electrically connected in parallel for attachment to the positive post of a DC power supply. Further, all the nickel foil counterelectrodes are electrically connected in parallel for attachment to the negative post of the aforementioned DC power supply. The stack is then placed into an electrolyte solution, permitting electrical contact between the electrodes.

In principle, no precursor electrode will exhibit a voltage rise independent of the other precursor electrodes because each of the precursor electrodes is made electrically common. Thus, when one of the precursor electrodes completes oxidation prior to the others, then even an infinitesimal increase in voltage produces an increased back electromotive force (EMF) which results in a drop-off in current through the already oxidized electrode and an altering of the current path through the other electrodes and thus a different current sharing pattern therein.

In addition, the conventional electrode formation technique of parallel oxidation is frequently accompanied by a bending of the electrodes. For example, the silver oxide electrodes resulting from the use of the above-identified method of oxidation are frequently of a bent, irregular shape. The bending of the electrode is believed to be largely a result of the stoichiometric and molar volume changes which occur upon oxidation during electrode formation and is commonly referred to as "potato chipping".

There are in addition two other problems caused by application of prior art techniques to bipolar electrode configurations. One is that the nickel foil at the anode potential oxides which hinders adhesion of the anode metal, e.g., lithium or aluminum. The second is that the parasitic oxidation decreases charging efficiency and for example, in the case of silver precursor electrodes, masks the voltage rise associated with the oxidation of silver to the divalent state, resulting in a low capacity of about 15 ampere-minutes per gram in the case of silver oxide.

SUMMARY OF THE INVENTION

It is an object of the present invention to overcome one or more of the problems described above.

According to the present invention, a system useful in the formation of electrodes for use in electrochemical cells comprises a power supply and a pair of conductive metallic terminal electrodes spaced apart from one another with at least one precursor electrode disposed therebetween. During operation of the system, the terminal and the precursor electrodes are disposed in an aqueous electrolyte. The terminals are in electrical contact with the power supply effecting electric current flow in the electrolyte away from the first of the terminals and toward the second of the terminals. The precursor electrode comprises a material to be reduced or oxidized and is orientated relative to the terminals so as to permit the reduction/oxidation of the material. In addition, the system includes restraining means for applying restraining forces to the precursor electrode to substantially maintain the dimensions of the precursor electrode during the reduction/oxidation. Separator means are disposed between the precursor electrode and the terminals and are generally effective in permitting the precursor electrode and the terminal electrodes to interface with the electrolyte while permitting a substantially uniform application of the restraining forces to the precursor electrode.

In addition to the above-described system, the invention comprehends a method of reduction/oxidation useful in the formation of electrodes for use in electrochemical cells.

Other objects and advantages of the invention will be apparent to those skilled in the art from the following detailed description, taken in conjunction with the appended claims and drawings.

DETAILED DESCRIPTION OF THE INVENTION

According to the invention, a system and a method of reduction/oxidation useful in the formation of electrode for use in electrochemical cells is provided. The invention contemplates a system having a pair of conductive metallic terminal electrodes spaced apart from one another with at least one precursor electrode disposed therebetween. During operation of the system the terminal electrodes and the precursor electrode are disposed in an aqueous electrolyte. The terminal electrodes are in electrical contact with a power supply effecting an electric current flow in the electrolyte away from the first of the terminals and toward the second of the terminals.

The invention may be used with precursor electrodes having various configurations provided that the precursor electrode comprise materials to be reduced/oxidized in electrical contact and orientated relative to the terminals so as to permit the reduction/oxidation of these materials. Reference herein to precursor bipolar electrodes of elemental silver disposed on silver clad bi-metal nickel foil is exemplary only, and the invention is understood to encompass the use of other electrode configurations and reactive metals.

Figure 1:
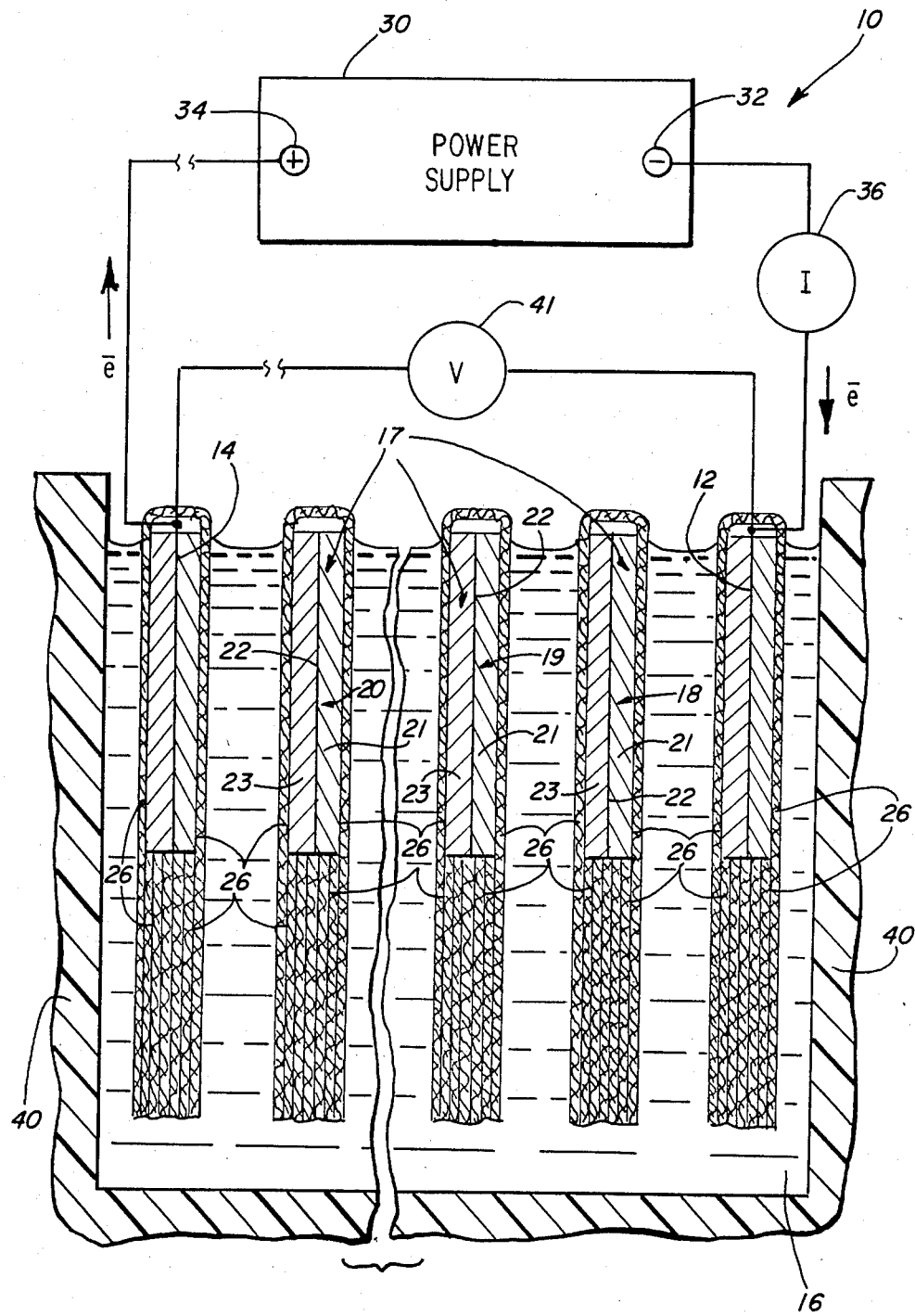
FIG. 1 is a simplified schematic diagram of a system for electrode formation according to a typical embodiment of the present invention.

Referring to FIG. 1, a system, generally designated 10, useful in the formation of electrodes for use in electrochemical cells is shown. The system 10 includes a pair of conductive metallic terminal or end electrodes 12 and 14 spaced apart from one another and disposed in an aqueous electrolyte 16. In the illustrated embodiment for the oxidation of elemental silver, the terminals 12 and 14 are made of nickel foil and the electrolyte may be any alkaline electrolyte such as NaOH, KOH or LiOH with KOH being preferred and KOH of a concentration of 30–45 wt % being especially preferred.

It is to be understood that for the oxidation/reduction of other materials, different electrolytes and/or different concentrations will be preferred. For example, for the oxidation of Ni, an electrolyte comprising KOH of a concentration of 20–30 wt % is preferred.

Disposed between the terminal electrodes 12 and 14, in electrolyte 16, are one or more precursor electrodes 17. (FIG. 1 shows three such precursor electrodes 17, individually identified as 18, 19 and 20.) Each of the precursor electrodes 17 comprises porous elemental silver 21 bonded to the silver side 22 of a bi-metal silver clad nickel foil 23. Surrounding each of the terminal electrodes 12 and 14 and the precursor electrodes 18, 19 and 20 is a wrap of a wicking type separator 26.

The stack-up of the silver 21 and the nickel foil 23 are compressed together to enhance electrolyte wicking. Such compressing/restraining forces may be exerted by the restraining plate walls 40 of system 10. For example, the walls 40 may be joined together by bolts and nuts (not shown) so as to permit a range of restraining forces to be produced thereby. It is to be understood that other means of applying restraining forces to the precursor electrodes may be used without departing from the spirit of the invention. These restraining forces serve to substantially maintain the dimensions of the precursor electrodes 17 during the reduction/oxidation and the consequent volumetric changes in the material 21 being reduced/oxidized.

The separator 26 permits the electrolyte 16 to come in contact and interface with the material 21 of each of the precursor electrodes 17 while permitting the restraining forces produced by the action of the restraining plate walls 40 to be substantially uniformly applied to the precursor electrodes 17. For example, Vexar (a trademark of E.I. duPont de Nemours & Co.) polypropylene plastic screen material has been used effectively as the separator material 26. The solid plastic parts of the screen separator 26 transmit the mechanical force being applied thereto while the openings in the screen separator 26 permit the electrolyte 16 to come in contact with the material 21 of the precursor electrodes 17.

A power supply 30 is electrically connected to the terminal electrodes 12 and 14, e.g., negative power supply terminal 32 is connected to terminal electrode 12 while positive power supply terminal 34 is connected to terminal electrode 14. The current passing through system 10 is read by an ammeter 36 while the voltage is read by voltmeter 41 which spans and connects terminal electrodes 12 and 14.

In practice, electric current flow is from the negative terminal 32 of power supply 30 to the nickel foil terminal electrode 12. The aqueous electrolyte interfaces with the nickel foil electrode 12 to release hydrogen gas. This reaction may be represented as:

$$2H_2O + 2e^- \rightarrow H_2 + 2OH^- \quad (1)$$

The hydroxide ion so produced flows towards and to the elemental silver 21 of precursor electrode 18. Thereafter, the elemental silver 21 of the precursor electrode 18 undergoes oxidation:

$$2OH^- + Ag \rightarrow AgO + H_2O + 2e^- \quad (2)$$

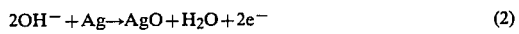

The electrons resulting from the above-identified oxidation flow through the AgO and Ag to reach the nickel foil 23 backside of the precursor electrode 18. These electrons react with water molecules of the aqueous electrolyte 16 (See equation 1 above.) The hydroxide ions produced as a result of equation 1 carry the charge to the next precursor electrode 19. In this way, many precursor electrodes may be placed in the gap between the terminal electrodes 12 and 14, effecting oxidation/reduction of the materials of the precursor electrode without making a direct mechanical connection to the precursor electrode.

In the above described system, it is important to accommodate the wetting or wicking of the terminal electrodes and the precursor electrodes, thereby permitting ionic electrochemical flow therebetween. The importance of the wetting or wicking phenomenon is further accentuated by the dehydration which results upon passage of current through each of the precursor electrodes, i.e., the end result of the simultaneous occurrence of equations 1 and 2, and is shown by the following reaction:

$$H_2O + Ag \rightarrow H_2 + AgO \quad (3)$$

The terminal electrode 14 evolves oxygen. The potential across the terminals 12 and 14, where hydrogen and oxygen, respectively, are evolved, is very dependent upon the current density but is in the neighborhood of 1.5 V, with a silver precursor electrode being oxidized first to the univalent level followed by further oxidization to the divalent state. Thus, each precursor electrode will contribute about 1.4 V until the second voltage plateau, i.e., that associated with the divalent state, is reached, whereupon the voltage increases to 1.8 V/precursor electrode.

Figure 2:
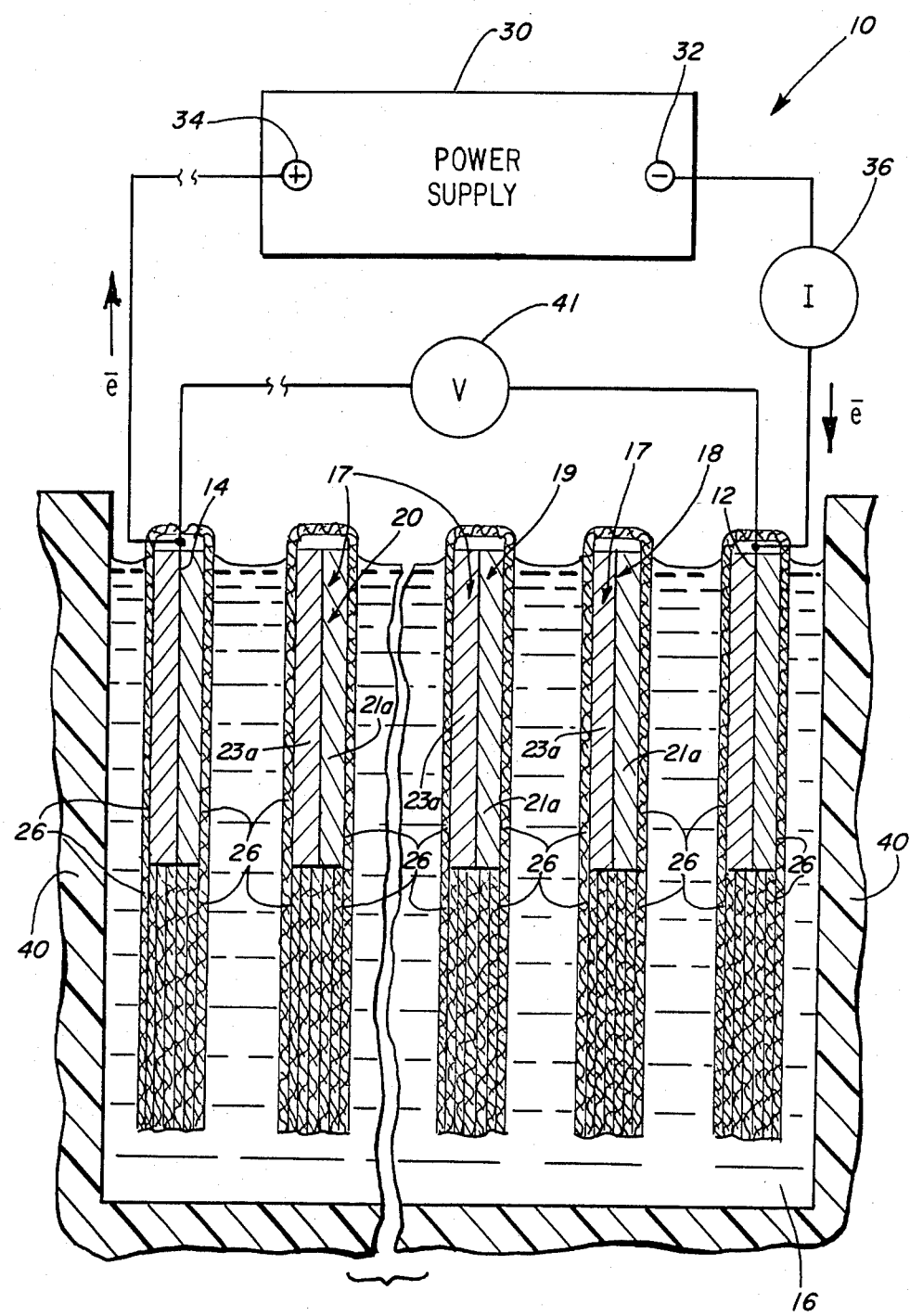
FIG. 2 is a simplified schematic diagram of a system for monopolar electrode formation according to a typical embodiment of the present invention.

The principles identified herein are capable of extension to the formation of electrodes other than the previously described bipolar precursor, including monopolar electrodes (see FIG. 2). For example, if two red oxidizable electrodes are used, such as nickel oxide 21a and cadmium 23a, they may be placed together in direct contact and used to substitute for the previously described precursor bipolar silver electrode. During the oxidation/reduction, nickelous oxide (NiO) is oxidized to nickelic oxide ($Ni_2O_3$) while cadmium hydroxide is reduced to metallic cadium. The invention may also be extended to electroplating as well as any battery system in which at least one active material is a solid.

More specifically, to oxidize or reduce a monopolar electrode, a metal plate may be placed over the backside of the electrode. Such configuration emulates the above described precursor electrode configuration. In such a design, hydrogen gas evolves from the water molecules coming in contact with the metal plate while the precursor monopolar electrode is oxidized. This technique can be exemplified as follows for both nickel oxide and cadmium electrodes but the principles are equally applicable to any active material suitable for secondary batteries.

Figure 3:
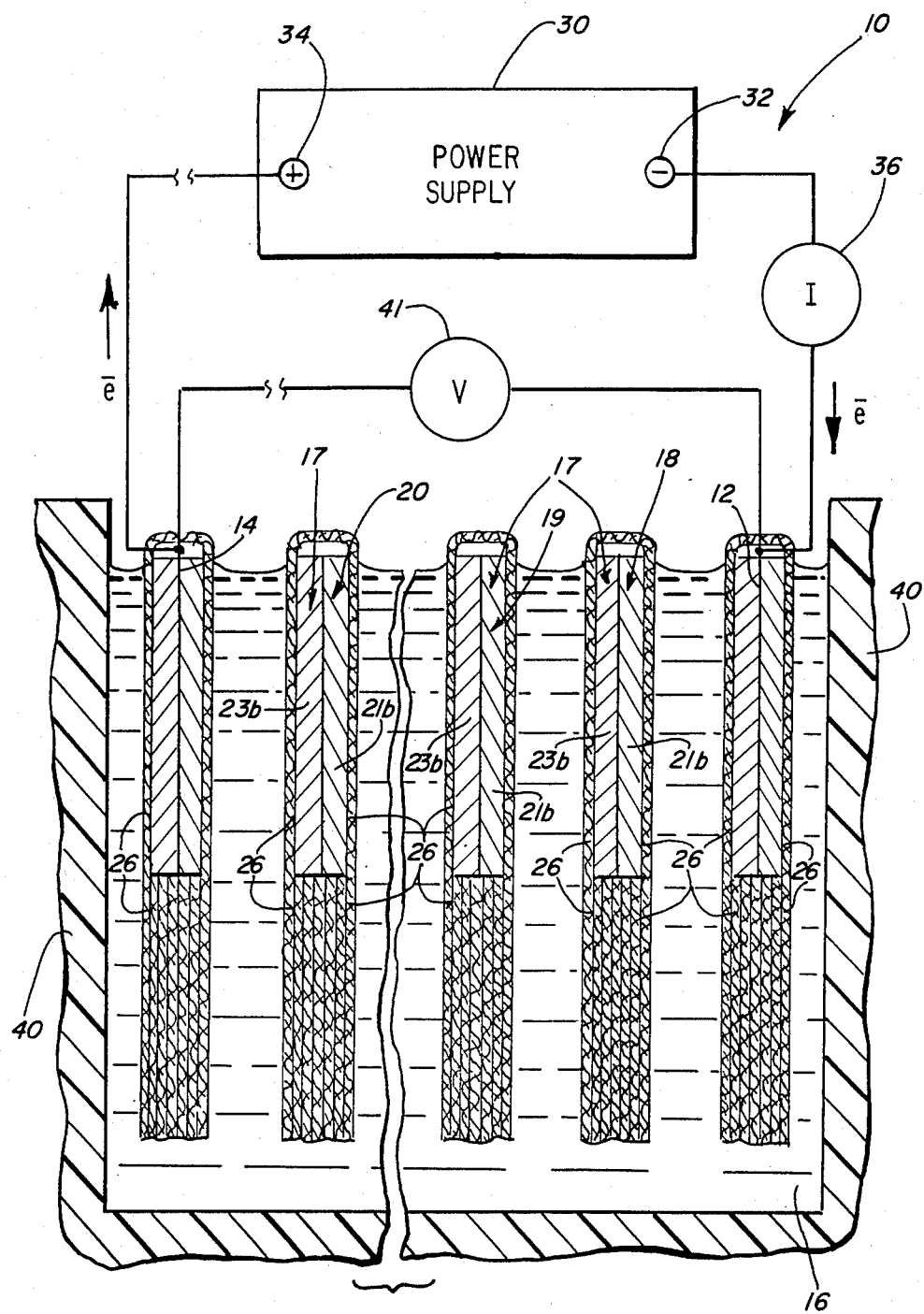
FIG. 3 is a simplified schematic diagram of a system for monopolar electrode formation according to another typical embodiment of the present invention.

When a nickel oxide electrode is to be oxidized (See FIG. 3), the nickel oxide 21b is placed into a system 10 so that it faces the terminal electrode 12 connected to the negative terminal 32 of the power supply 30. The material to be oxidized 21b is mechanically separated from the negative electrode by a spacer or a separator 26 but is in electrochemical contact with the negative electrode 12 through the ionically conductive electrolyte 16. The backside of the nickel oxide electrode 21b is fully covered with a coupon of metal 23b, such as nickel, which does not react with the electrolyte and on whose surface equation 1, identified above, may occur. The backplate 23b is thus induced to serve as a negative electrode for the very next cell. This arrangement can then be repeated as many times as desired.

The nickel or other metal backplate 23b is held in electrical contact with the nickel oxide electrode 21b. Such contact may be effected by a mechanical jig or other suitable means (not shown).

Figure 4:
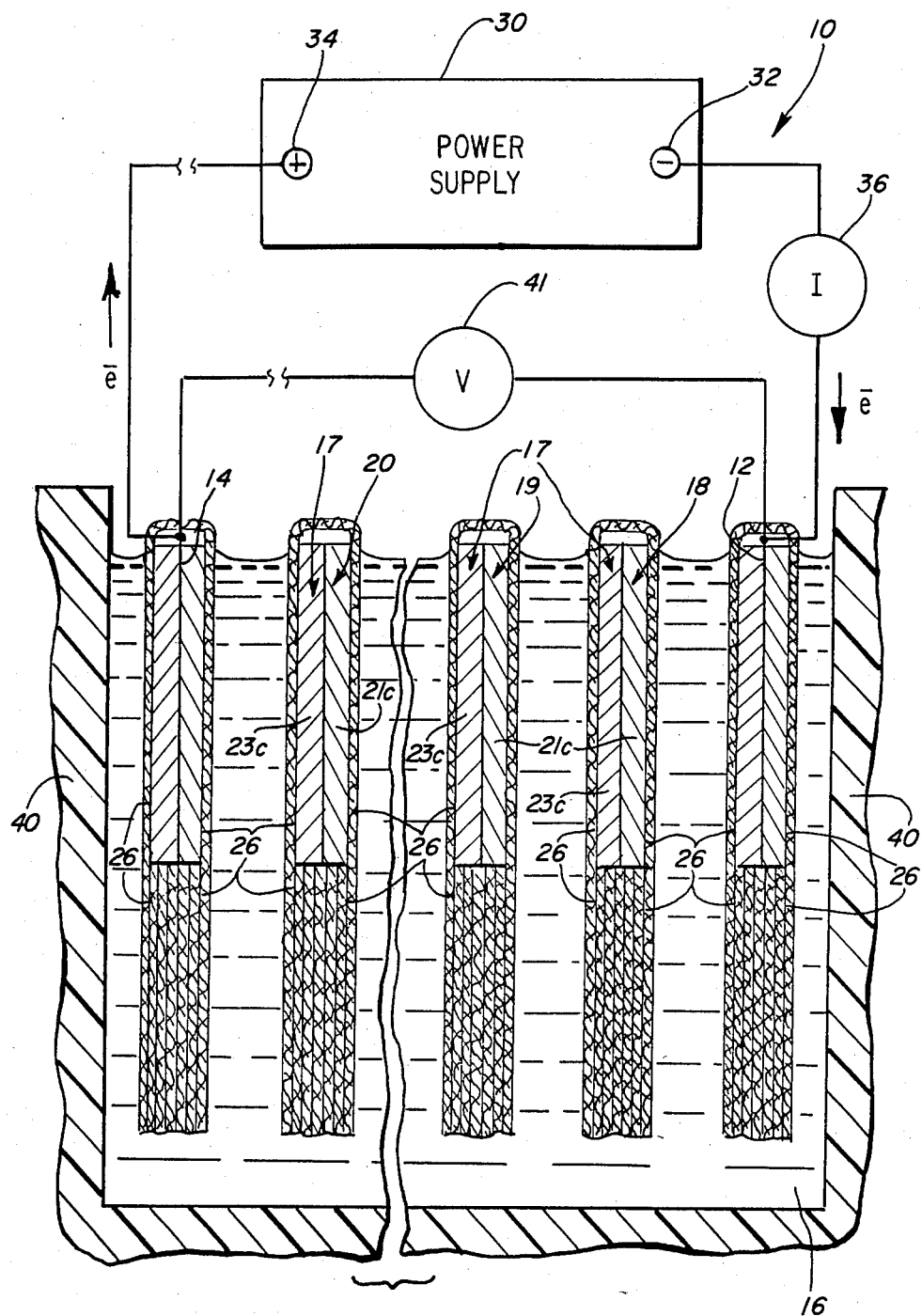
FIG. 4 is a simplified schematic diagram of a system for electrode formation according to another typical embodiment of the present invention.

If a cadmium electrode is to be reduced (See FIG. 4), for example to later serve as an anode in a rechargeable cell, then the cadmium electrode 23c is orientated so as to face the positive electrode 14 of the system 10. A foil of metal 21c, at whose surface oxygen is evolved from water, is placed in contact with the backside of the cadmium electrode. A jig or fixture arrangement as previously described may be used to maintain the contact between the metal foil and the cadmium electrode.

Figure 5:
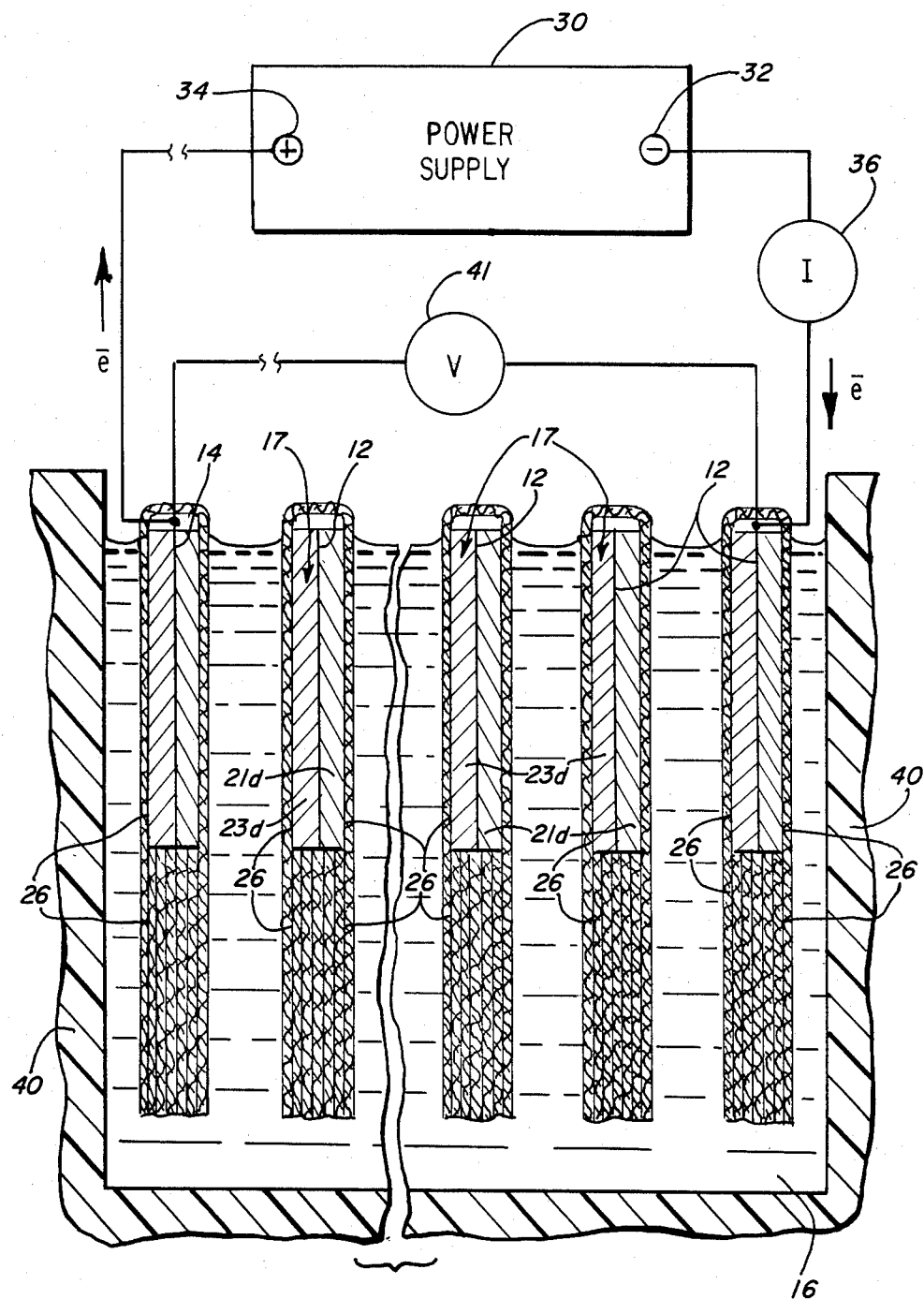
FIG. 5 is a simplified schematic diagram of a system for the simultaneous formation of negative and positive electrodes according to a typical embodiment of the present invention.

Similarly, a negative 21d and a positive electrode 23d can be simultaneously oxidized/reduced by placing one against the other (See FIG. 5). To effect a better control with complete oxidation, it has been found preferable to use a metal foil substrate 42 between the active materials. In practice, negative electrodes 23d generally have a greater capacity built into them than do positive electrodes 21d. For example, the oxidation/reduction process causes $NI^{+2}$ to become $NI^{+3.86}$ and $Cd(OH)_2$ to become $Cd°$. When all the Ni has been oxidized, the nickel oxidation process changes to one of oxygen evolution, while the reduction of the $Cd(OH)_2$ to $Cd°$ continues. The foil substrate 42 serves to intercede and prevent the oxygen evolving at the nickel electrode 21d from reaching the $Cd°$. As a consequence, oxygen is generated on the positive electrode side of the foil substrate with $Cd°$ being generated from $Cd(OH)_2$. In this way, both electrodes 21d and 23d may be brought to a state of maximum oxidation/reduction without significantly interfering with each other.

The foregoing detailed description is given for clearness of understanding only, and no unnecessary limitations are to be understood therefrom, as modifications within the scope of the invention will be obvious to those skilled in the art.

I claim:

1. A system useful in the formation of electrodes for use in electrochemical cells, said system comprising:
   a power supply;
   a pair of conductive metallic terminal electrodes spaced apart from one another and disposed in an aqueous electrolyte during operation of said system, said terminal electrodes being in electrical contact with said power supply effecting electric current flow in said electrolyte away from the first of said terminals and toward the second of said terminals;
   at least one precursor electrode comprising a material to be reduced or oxidized in electrical contact with a conductive backplate, said precursor electrode being disposed in said electrolyte between said terminal electrodes and orientated relative thereto so as to permit said reduction or oxidation of said material;
   restraining means for applying restraining forces to said precursor electrode substantially maintaining the dimensions of said precursor electrode during said reduction or oxidation; and,
   separator means disposed between said precursor electrode and said terminal electrodes permitting said precursor electrode and said terminal electrodes to interface with said electrolyte and permitting a substantially uniform application of said restraining forces to said precursor electrode.

2. The system of claim 1 wherein said conductive backplate forms a substrate upon which said material to be reduced or oxidized is disposed.

3. The system of claim 2 wherein said material to be oxidized comprises elemental silver.

4. The system of claim 3 wherein said substrate comprises a bi-metal silver clad foil.

5. The system of claim 1 wherein said material to be oxidized comprises elemental silver or NiO.

6. The system of claim 5 wherein said conductive backplate comprises elemental nickel.

7. The system of claim 1 wherein said material to be reduced comprises cadmium hydroxide.

8. The system of claim 1 wherein said precursor electrode comprises a material to be reduced and said conductive backplate comprises a material to be oxidized.

9. The system of claim 1 comprising a plurality of said precursor electrodes with separator means disposed therebetween, said precursor electrodes being orientated relative to each other and said terminal electrodes permitting said reduction or oxidation of said material.

10. The system of claim 1 wherein said separator means comprises a rigid, non-conductive porous member.

11. The system of claim 10 wherein said rigid porous member comprises a rigid plastic screen.

12. The system of claim 11 wherein said plastic comprises polypropylene.

13. The system of claim 1 wherein said material to be reduced or oxidized and said conductive backplate are in direct mechanical contact with each other.

14. A method of reduction/oxidation useful in the formation of electrodes for use in electrochemical cells, said method comprising the step of:

effecting electric current flow through an aqueous electrolyte in a system comprising;

a power supply, a pair of conductive metallic terminal electrodes spaced apart from one another and disposed in said electrolyte during operation of said system, said terminal electrodes being in electrical contact with said power supply effecting current flow in said electrolyte away from the first of said terminals and toward the second of said terminals;

at least one precursor electrode comprising a material to be reduced or oxidized in electrical contact with a conductive backplate, said precursor electrode being disposed in said electrolyte between said terminal electrodes and orientated relative thereto so as to permit said reduction or oxidation of said material, restraining means for applying restraining forces to said precursor electrodes substantially maintaining the dimensions of said precursor electrode during said reduction or oxidation, and separator means disposed between said precursor electrode and said terminal electrodes permitting said precursor electrode and said terminal electrodes to interface with said electrolyte and permitting a substantially uniform application of said restraining forces to said precursor electrode.

15. The method of claim 14 wherein said conductive backplate forms a substrate upon which said material to be reduced or oxidized is disposed.

16. The method of claim 15 wherein said material to be oxidized comprises elemental silver.

17. The method of claim 16 wherein said substrate comprises a bi-metal silver clad foil.

18. The method of claim 14 wherein said material to be oxidized comprises elemental silver or NiO.

19. The method of claim 18 wherein said conductive backplate comprises elemental nickel.

20. The method of claim 14 wherein said material to be reduced comprises cadmium hydroxide.

21. The method of claim 14 wherein said precursor electrode comprises a material to be reduced and said conductive backplate comprises a material to be oxidized.

22. The method of claim 14 comprising a plurality of said precursor electrodes with separator means disposed therebetween, said precursor electrodes being orientated relative to each other and said terminal electrodes permitting said reduction or oxidation of said material.

23. The method of claim 14 wherein said separator means comprises a rigid, non-conductive porous member.

24. The method of claim 23 wherein said rigid porous member comprises a rigid plastic screen.

25. The method of claim 24 wherein said plastic comprises polypropylene.

26. The method of claim 14 wherein said material to be reduced or oxidized and said conductive backplate are in direct mechanical contact with each other.

* * * * *